(12) United States Patent
Pelliccioni

(10) Patent No.: US 7,832,710 B2
(45) Date of Patent: Nov. 16, 2010

(54) DEVICE FOR TENSIONING BELTS AND THE LIKE

(76) Inventor: Giuseppe Pelliccioni, Piazza de Bernardi 18, Nuoro (IT) I-08100

( * ) Notice: Subject to any disclaimer, the term of this patent is extended or adjusted under 35 U.S.C. 154(b) by 317 days.

(21) Appl. No.: 11/995,238

(22) PCT Filed: Jul. 14, 2006

(86) PCT No.: PCT/IB2006/001941
§ 371 (c)(1),
(2), (4) Date: Jan. 10, 2008

(87) PCT Pub. No.: WO2007/007181
PCT Pub. Date: Jan. 18, 2007

(65) Prior Publication Data
US 2008/0197227 A1    Aug. 21, 2008

(30) Foreign Application Priority Data
Jul. 14, 2005    (IT)    .......................... BO2005A0471

(51) Int. Cl.
*B66D 3/00* (2006.01)
(52) U.S. Cl. .................. 254/247; 254/353; 254/357; 254/369; 254/373; 242/395; 242/385.4; 242/385
(58) Field of Classification Search .................. 254/217, 254/219, 223, 239, 241, 243, 247, 344, 352, 254/353, 357, 369, 376; 242/395, 385.4, 242/385, 382, 384.7, 388, 388.1, 388.4
See application file for complete search history.

(56) References Cited

U.S. PATENT DOCUMENTS

| 3,927,580 | A | * | 12/1975 | Fawcett .................... 74/810.1 |
| 4,252,158 | A |   | 2/1981  | McDade |
| 4,328,954 | A | * | 5/1982  | Logus ........................ 254/344 |
| 4,456,227 | A | * | 6/1984  | Notenboom ................ 254/350 |
| 4,545,567 | A | * | 10/1985 | Telford et al. ............... 254/344 |
| 4,771,987 | A | * | 9/1988  | Priest ........................ 254/280 |
| 5,746,192 | A | * | 5/1998  | Gissel ............................ 124/1 |
| 5,842,684 | A | * | 12/1998 | Aho ............................ 254/344 |
| 6,017,173 | A |   | 1/2000  | Anthony et al. |
| 6,357,133 | B1 | * | 3/2002 | Hsu ............................ 33/755 |
| 6,550,155 | B1 | * | 4/2003 | Hsu ............................ 33/755 |
| 6,916,267 | B2 | * | 7/2005 | Jones et al. ................. 475/299 |
| 2003/0059269 | A1 |   | 3/2003 | Bosley |

FOREIGN PATENT DOCUMENTS

GB    2128574 A    5/1984

* cited by examiner

*Primary Examiner*—Emmanuel M Marcelo
(74) *Attorney, Agent, or Firm*—Brooks Kushman P.C.

(57) ABSTRACT

The tensioning device for belts and the like comprises a supporting base (2), a winding reel (6) which can rotate relative to the base (2) about a respective axis of rotation (A1), a ring gear (13) which rotates integrally with the reel (6), an operating lever (14) for rotating the reel (6) in a first predetermined direction of rotation (S1) for winding the belt, a ratche mechanism (39), operating on the ring gear (13) and designed to prevent the reel (6) from rotating in a second direction of rotation (S2) opposite to the first predetermined direction (S1), the ratchet mechanism (39) comprising respective release means for allowing belt unwinding by reel (6) rotation in the second direction of rotation (S2). Further, the ratchet mechanism (39) comprises a first tooth (19) for engagement with the ring gear (13), the first tooth being designed to oscillate about two respective axis of oscillation (O1, O2).

24 Claims, 8 Drawing Sheets

DEVICE FOR TENSIONING BELTS AND THE LIKE

TECHNICAL FIELD

The present invention relates to a device for tensioning belts and the like.

In particular, the present invention relates to a device for tensioning belts and other flexible elements, of the type normally used for example to secure loads and goods.

In this text the term belt is used by way of example and without limiting the scope of the invention, which may also comprise cables, ropes or straps made of any material, provided that they are flexible and designed to be tensioned.

BACKGROUND ART

Tensioning devices, also commonly known as belt tightener devices, are used to transport goods, to secure the load to the respective means of transport; for example, to fix the goods on the body of a truck or secure boats on the trailer during transportation or even to fix loads on car roof racks.

The most widespread known type of devices comprise a reel for winding the belt, a support, a lever and a ratchet gear designed to allow reel rotation in one direction only.

The lever, the support and the reel are all connected by a pin which also forms a reel axis of rotation.

Operation of said type of device is rather simple and allows, with an alternating movement of the lever, the reel to be rotated, causing the belt to be wound on it; the alternating movement of the lever being allowed by the ratchet gear which ensures that the lever pulls the reel, making it rotate only in the direction of rotation in which the belt is wound, whilst in the opposite direction the lever moves freely so that it can return to its starting position for a new winding step.

The ratchet gear usually comprises two gearwheels positioned at the longitudinal ends of the above-mentioned pin, and two elements which engage with the gearwheels, or teeth, one of which performs the function described above of allowing rotation of the gearwheel and the reel in one direction only, whilst the other has the function of both stopping rotation of the reel, subject to the load consisting of the tension applied to the belt during the lever recovery stroke, and of maintaining the final belt tension.

The engagement elements are held in their operating positions by respective elastic springs and can be disengaged from the gearwheels by overcoming the opposing action of the elastic springs, to allow rotation of the reel in the opposite direction and belt unwinding from the reel.

Known tensioning devices of the type described above are not without disadvantages.

A first disadvantage is the fact that the engagement elements, sliding over other parts of the device, both during the winding movement and during the gearwheel disengagement step, generate significant friction with said parts and, moreover, since all of the components of the device are substantially external, it is impossible to effectively lubricate them.

Another disadvantage is the large longitudinal dimensions of the known devices, not just during winding operating steps but also in the non-operating condition.

Since, for example, the reel is usually released after reaching the maximum relative opening condition between the support and lever, it is often the case that due to the large dimensions of the device, after tensioning the belt, it is realised that there is insufficient space to easily release the reel and for subsequent belt unwinding.

Another disadvantage linked to the use of the known devices is the fact that it is impossible to rapidly release the belt.

This failure is noticed above all in cases in which rapid release could affect user safety.

DISCLOSURE OF THE INVENTION

The aim of the present invention is therefore to overcome the above-mentioned disadvantages by providing a tensioning device for belts and like which is compact and at the same time functional and practical to use.

The technical features of the present invention, in accordance with the above aim, are clear from the content of the claims herein, in particular claims 1 and 19, and from any of the claims directly or indirectly dependent on claim 1.

BRIEF DESCRIPTION OF THE DRAWINGS

The advantages of the present invention are more apparent in the detailed description which follows, with reference to the accompanying drawings which illustrate preferred, non-limiting embodiments of the invention, in which.

DETAILED DESCRIPTION OF THE PREFERRED EMBODIMENTS OF THE INVENTION

With reference to the accompanying drawings, the numeral 1 denotes as a whole a tensioning device for belts, the latter not illustrated, made in accordance with the present invention.

Figure 1:
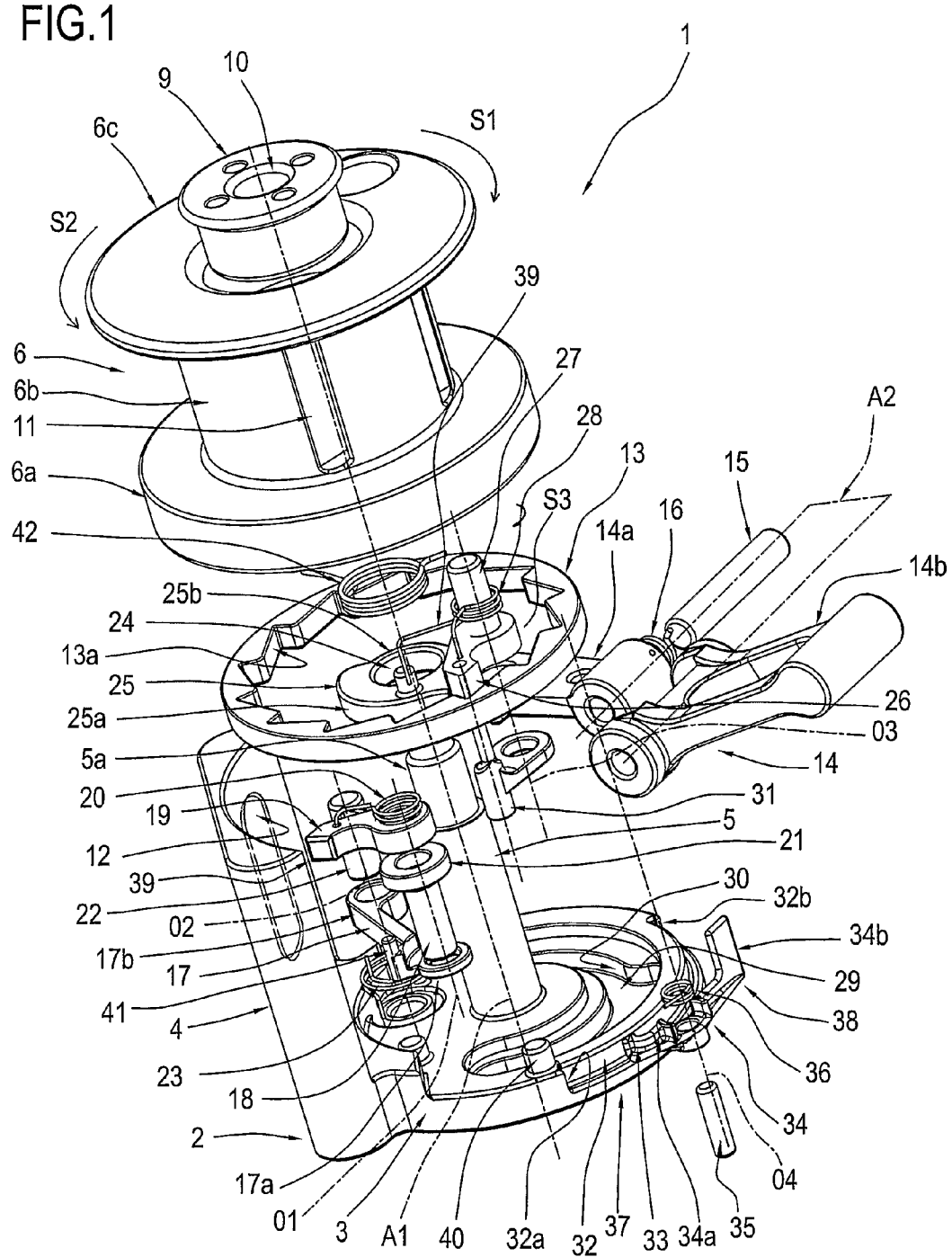
FIG. 1 is an exploded perspective view of a first embodiment of the tensioning device made in accordance with the present invention.

As shown in FIG. 1, the device 1 comprises a supporting base 2 comprising a platform 3, roughly circular, and a wall 4 projecting from the platform 3.

A first pin 5 with a central axis A1 is fixed to and projects from the platform 3 and has a threaded distal end 5a.

Figure 4:
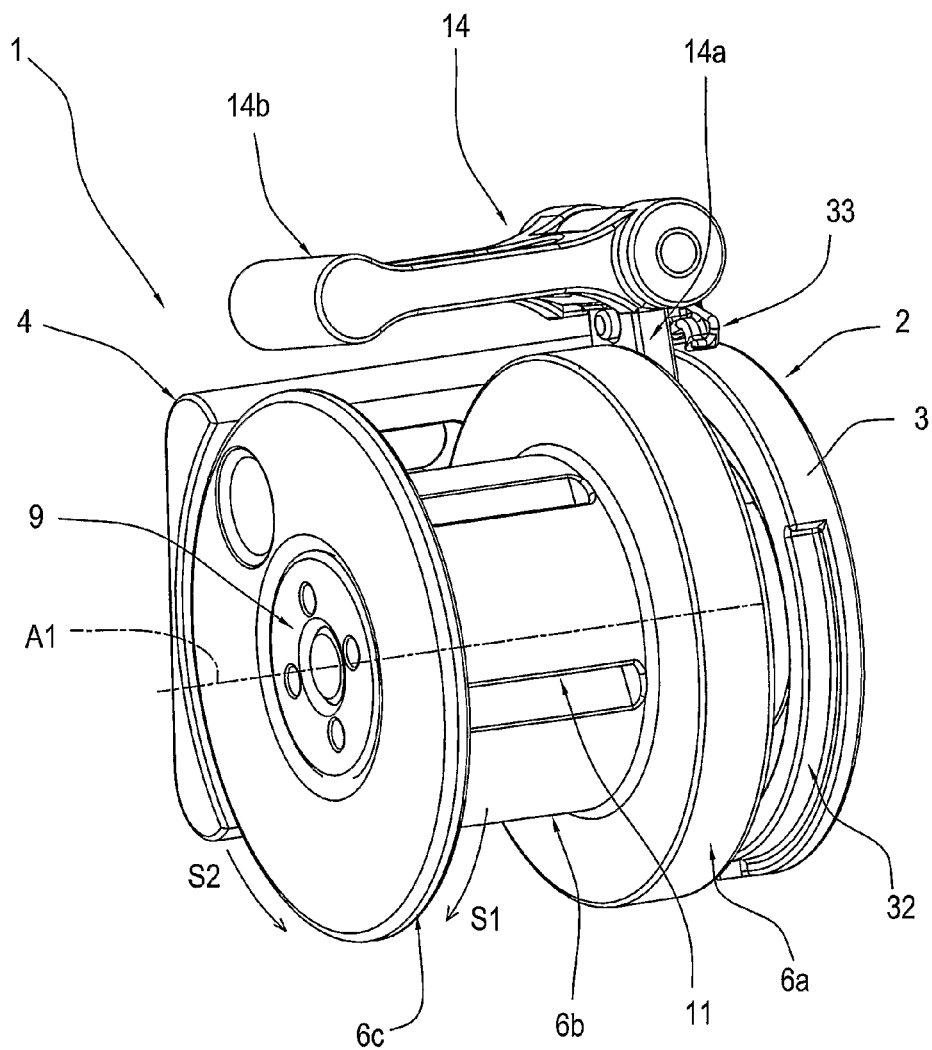
FIG. 4 is a perspective view of the device from FIG. 3.

As is also shown in FIG. 4, pivoted on the first pin 5 there is a reel 6 for winding a belt, the latter not illustrated.

The central axis A1 of the first pin 5 forms a respective axis of rotation for the reel 6.

The reel 6 has an axially symmetrical shape and comprises a first proximal ring-shaped edge 6a, a substantially cylindrical central body 6b on which the belt is wound, and a distal ring-shaped edge 6c.

A first direction of rotation of the reel 6, which results in the belt being wound on the reel 6, is indicated in the accompanying drawings with an arrow S1.

The ring-shaped edges 6a, 6c constitute a contact surface for the longitudinal edges of the belt, guaranteeing regular winding of the belt on top of itself.

Figure 2:
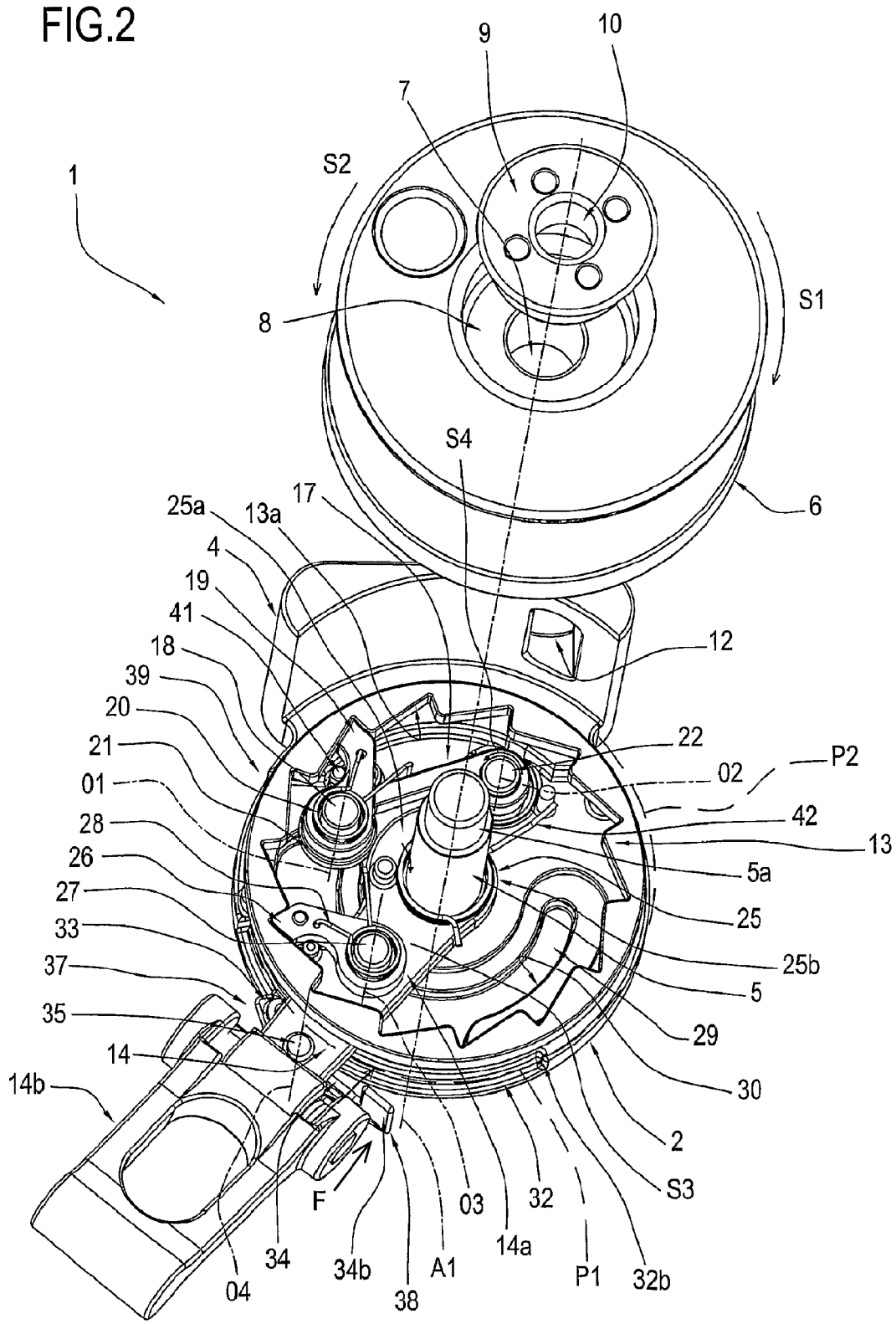
FIG. 2 is a perspective view with some parts exploded for clarity, of the device from FIG. 1 in a first operating configuration.

With reference to FIG. 2, the reel 6 has a central through-hole 7 designed to allow insertion of the first pin 5 and, if necessary, insertion between the reel 6 and the first pin 5, of an anti-friction bearing 8, rolling or sliding.

A plug 9 closes the top of the hole 7 and holds the reel 6 stably fitted on the first pin 5; the plug 9 having a hole 10 with internal threading which engages with the threaded distal end 5a of the first pin 5 by screwing onto the latter.

In the reel 6 there is a through-opening 11 for insertion of a first end of the belt to be wound on the reel 6.

In the projecting wall 4 of the base 2 there is a slot 12 for fixing a second end of the belt.

As illustrated in FIG. 1, the device 1 also comprises a ring gear 13, having internal toothing 13a, the ring gear 13 being inserted in the proximal ring-shaped edge 6a of the reel 6 and made integral with it by fixing elements of the known type and not illustrated.

With reference to FIG. 1, the device 1 comprises a lever 14 for operating the reel 6.

The operating lever 14 comprises a first portion 14a pivoted on the first pin 5 and a second portion 14b to be gripped by a user.

The first and second portions 14a, 14b of the lever 14 are connected to one another by a joint and the second portion 14b is rotatably connected to the first portion 14a by a respective pin 15 with a central axis A2. The central axis A2 of the pin 15 lies in a plane, not illustrated, perpendicular to the axis of rotation A1 of the reel 6.

A spring 16 of the known type guarantees maintenance of a minimum dimensions stable equilibrium position such as that shown in FIG. 4.

With reference to the accompanying drawings 1, 2 and 3, the device 1 comprises an arm 17 with two longitudinally opposite ends 17a, 17b.

On the arm 17, at the first end, labelled 17a, there is pivoted, by means of a pin 18 with a central axis O1, a first tooth 19 for engagement with the ring gear 13.

The first tooth 19 is therefore designed to oscillate relative to the arm 17 about the axis O1 of the pin 18 whose axis O1 therefore forms a first axis of oscillation for the first tooth 19. A helical spring subjected to bending stress 20 is fitted so that it is coaxial with the pin 18 on which the first tooth 19 is pivoted, with its end coils in contact respectively with the arm 17 and with the first tooth 19.

An anti-friction bearing 21 is fitted so that it is coaxial with the pin 18 at the first end 17a of the arm 17. The bearing 21 has, in the direction of the first pin 5 of the reel 6, a radial dimension larger than both the first tooth 19 and the arm 17.

At its second end 17b, the arm 17 is pivoted on the platform 3 of the base 2, by means of a pin 22 with a central axis O2.

The arm 17 is therefore designed to oscillate relative to the base 2 about the axis O2 of the pin 22, said axis O2 therefore forming a second axis of oscillation for the first tooth 19 which is supported by the arm 17.

A helical spring subjected to bending stress 23 is fitted so that it is coaxial with the pin 22 on which the arm 17 is pivoted, with its end coils in contact respectively with the base 2 and with the arm 17.

The first and second axes of oscillation O1, O2 are parallel with one another and with the axis of rotation A1 of the reel 6.

As illustrated in FIGS. 1 and 2, the first portion 14a of the operating lever 14 has a hole 24 for insertion of the first pin 5 of the reel 6 and, extending around the hole 24, a first cam profile 25.

The first cam profile 25 comprises a first sector 25a, with larger radial extension, and a second sector 25b, with smaller radial extension, where said radial extensions are assessed with reference to the axis A1 of the first pin 5 on which the hole 24 is fitted in an operating configuration illustrated in FIG. 2.

The first portion 14a of the operating lever 14 supports a second tooth 26 for engagement with the ring gear 13.

The second tooth 26 is pivoted on the lever 14 by means of a pin 27 with a central axis O3, and is designed to oscillate relative to the lever 14 about the axis O3 of the pin 27, therefore the axis O3 forms a third axis of oscillation for the device 1.

A helical spring subjected to bending stress 28 is fitted so that it is coaxial with the pin 27 on which the second tooth 26 is pivoted, with its end coils in contact respectively with the operating lever 14 and with the second tooth 26.

In the base 2 platform 3 there is a slot 29, one of whose walls forms a second cam profile 30.

A yielding element 31 is pivoted on the pin 27 on which the second tooth 26 pivots and is integral with it in its oscillations about the third axis of oscillation O3.

The yielding element 31 is partly inserted in the slot 29 to engage with the second cam profile 30 using methods described in detail below.

On a peripheral portion of the base 2 platform 3 there is a track 32 with two end walls 32a, 32b. A sliding element 33 supported by the operating lever 14 engages slidably in the track 32.

The sliding element 33 is formed by a first arm 34a of a rocker lever 34 pivoted, by means of a pin 35, on the first portion 14a of the operating lever 14, to oscillate about a central axis O4 of the pin 35. The rocker lever 34 also comprises a second control arm 34b, substantially extending in line with the first arm 34a.

A helical spring subjected to bending stress 36 is fitted so that it is coaxial with the pin 35 of the rocker lever 34 and is designed to hold the sliding element 33 engaged with the track 32.

The sliding element 33 and the track 32 form guide means 37 for the operating lever 14.

With reference to FIG. 2, the guide means 37 form, for the operating lever 14, a first predetermined angular path P1 which, as explained in detail below, the lever 14 follows with alternating motion in order to wind the belt, not illustrated, on the reel 6.

The second control arm 34b of the rocker lever 34 forms means 38 for disengagement of the sliding element 33 from the track 32 and, consequently, also disengagement of the lever 14 from its guide means 37.

The special toothing 13a of the ring gear 13, together with the first and second engagement teeth 19, 26, form a ratchet gear 39 designed to prevent reel 6 rotation in a second direction of rotation indicated by an arrow S2 in the accompanying drawings and opposite to the first direction of rotation S1.

In practice, advantageously with the two portions 14a, 14b of the operating lever 14 positioned substantially in line with one another as illustrated in FIG. 2, by making the lever 14 rotate clockwise, that is to say in the direction indicated by the arrow S1, said rotation is also passed on to the ring gear 13 and the reel 6 integral with it.

When the operating lever 14 is rotated in the direction S1, the second tooth 26 engages with the toothing 13a of the ring gear 13 since it is forced to adhere to it by the action of the spring 28.

Simultaneously, when the operating lever 14 is rotated in the direction S1, the first engagement tooth 19 slides on the toothing 13a of the ring gear 13, oscillating about its first axis of oscillation O1 since it is forced to remain in contact with the toothing 13a by the elastic action of the spring 20.

In practice, during the clockwise rotation of the lever 14, for each tooth of the toothing 13a, the first engagement tooth 19 snaps back into place as a result of the step taken.

During said clockwise rotation of the lever 14, that is to say, in direction S1, the first sector 25a of the first cam profile 25, said first sector 25a having a practically constant radial dimension, rolls on the anti-friction bearing 21 fitted at the first end 17a of the arm 17 which supports the first tooth 19 and maintains a substantially constant centre-to-centre distance between the first axis of oscillation O1 of the first tooth 19 and the reel 6 axis of rotation A1.

In other words, the spring 23, visible in FIG. 1 and operating on the arm 17, would push the arm 17 so that it rotates about the second axis of oscillation O2 to move its first end 17a towards the first pin 5 of the reel 6, and therefore to move the first tooth 19 away from the ring gear 13, but said movement is prevented by the first larger sector 25a of the first cam profile 25 which opposes the rotation of the arm 17 about its pivot pin 22.

The configuration described above in which the first tooth 19 is designed to engage with the toothing 13a of the ring gear 13 forms a first, operating limit position for the arm 17.

Assuming that the first end of the belt, not illustrated, was previously fixed in the through-opening 11, during reel 6 clockwise rotation the belt is wound around the reel 6 central body 6b, visible in FIG. 1.

When, during said clockwise rotation in direction S1, the lever 14 reaches an end of its first path P1, it stops in contact with a stop 40, visible in FIG. 1, integral with the platform 3.

The clockwise rotation of the operating lever 14 just described constitutes a lever 14 active stroke.

Starting from the stopped condition described above, by making the lever 14 rotate anti-clockwise, that is to say in the direction indicated by the arrow S2, the lever 14 returns to the other end of the first path P1, without any rotation of the ring gear 13 and the reel 6 integral with it.

When the operating lever 14 is rotated in direction S2, the second engagement tooth 26 slides on the toothing 13a of the ring gear 13, oscillating about the third axis of oscillation O3 since it is forced to remain in contact with the toothing 13a, by the elastic action of the helical spring 28.

In practice, during the anti-clockwise rotation of the lever 14, for each tooth of the toothing 13a, the second engagement tooth 26 snaps back into place as a result of the step taken.

During the anti-clockwise rotation of the lever 14 just described, the second engagement tooth 26 which slides on the toothing 13a could also pull the ring gear 13, if the latter were not held by the first engagement tooth 19 which is firmly engaged with the toothing 13a.

As is clearly illustrated in FIG. 2, the first engagement tooth 19, stopping in contact with a projection on the toothing 13a of the ring gear 13, prevents ring gear 13 rotation in the direction S2.

If, in addition to the negligible pulling by the second tooth 26, the tension of the belt being wound were to exert on the reel 6 and the ring gear 13 a moment of anti-clockwise rotation, on the first tooth 19, considering its position in the ring gear 13, the latter would exert a force such that it would cause the first tooth 19 to rotate anti-clockwise both about the first axis of oscillation O1, and about the second axis of oscillation O2.

However, as shown in FIG. 2, anti-clockwise rotation of the first tooth 19 about the first axis of oscillation O1 is inhibited by the obstruction consisting of a stop 41 integral with the arm 17, whilst anti-clockwise rotation of the first tooth 19 about the second axis of oscillation O2 is inhibited by the obstruction consisting of the first sector 25a of the first cam profile 25, the first sector 25a engaging in a rolling fashion on the anti-friction bearing 21.

The anti-clockwise rotation of the operating lever 14 just described constitutes a lever 14 return stroke.

The anti-clockwise return stroke of the operating lever 14 just described ends when the sliding element 33 stops in contact with the end wall 32b of the track 32.

Since, apart from the negligible resistance offered by the second tooth 26 sliding on the toothing 13a, said lever 14 return stroke is substantially performed in the absence of a load, to avoid impacts with the end wall 32b of the track 32, in the final section of the first path P1 the lever 14 engages with an end coil of a spiral spring 42 fitted on the first pin 5, the spring 42 exerting an action opposing the anti-clockwise rotation in said final section.

Cyclical repetition of the above-mentioned operating lever 14 active and return strokes allows the device 1 user to wind the belt on the reel 6 and to achieve the desired degree of belt tensioning.

In contrast, when, for example to unload goods previously secured with the belt, not illustrated, the belt must be loosened, the following procedure applies.

Starting from the configuration described but not illustrated in which the operating lever 14, at the end of a return stroke, has the sliding element 33 in contact with the end wall 32b of the track 32, pushing the second control arm 34b of the rocker lever 34 in the direction of the arrow F shown in FIG. 2 so as to overcome the elastic resistance of the spring 36, the sliding element 33 is disengaged from the track 32. In this way, it is possible to rotate the operating lever 14 along a second path P2, in the anti-clockwise direction S2, beyond the end of its first path P1, overcoming the opposing action of the spiral spring 42 fitted on the first pin 5 of the reel 6.

Figure 3:
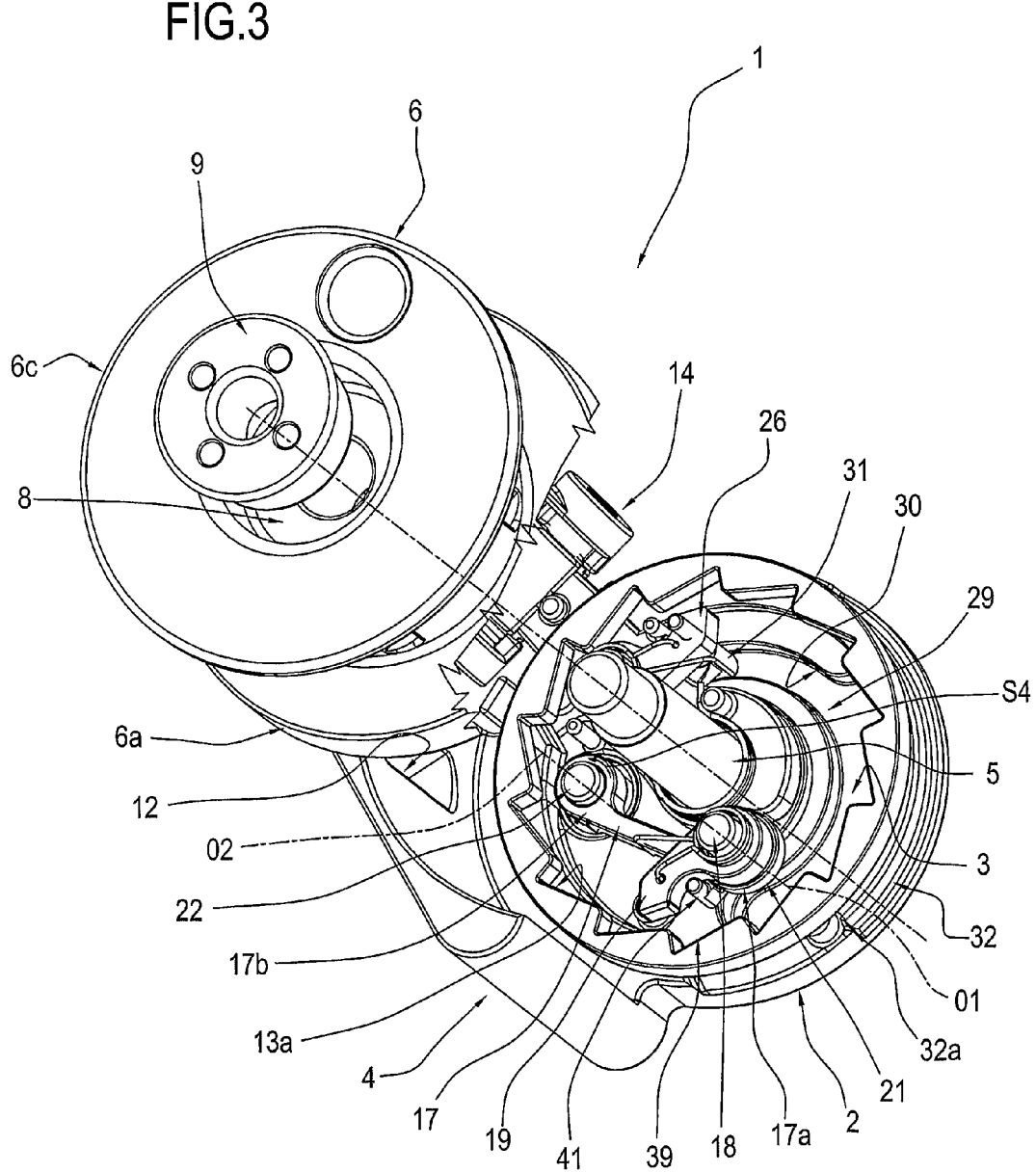
FIG. 3 is a perspective view with some parts exploded and in cross-section for clarity, of the device from FIG. 1 in a second operating configuration.

As illustrated in FIG. 3, when the operating lever 14 starts on its second path P2, the yielding element 31 engages with the second cam profile 30 of the slot 29.

The contact between the second cam profile 30 and the yielding element 31 causes clockwise rotation in the direction S3 by the latter, and by the second engagement tooth 26 integral with it, about the third axis of oscillation O3.

The immediate consequence of the clockwise rotation of the second tooth 26 is disengagement of the latter from the ring gear 13 toothing 13a.

Continuing rotation of the operating lever 14 in the anti-clockwise direction S2 along its second path P2, the anti-friction bearing 21, coaxial with the first axis of oscillation O1, loses its contact with the first sector 25a of the first cam profile 25 and instead makes contact with the second sector 25b of the first profile 25.

As illustrated in FIG. 3, due to the different radial extension of the two sectors 25a, 25b, the arm 17, which adheres to the first cam profile 25 due to the action of the spring 23, rotates anti-clockwise in the direction S4 about the second axis of oscillation O2, causing the first tooth 19 to disengage from the ring gear 13.

The stop 41, halting the anti-clockwise rotation of the first tooth 19, prevents it from engaging with or in any case striking the toothing 13a.

If during this step the belt is under tension, said tension, adding to the action of the spring 23, contributes to the anti-clockwise rotation of the arm 17 since, forcing the reel 6 and the ring gear 13 to rotate in the direction S2, through the toothing 13a it transmits to the first tooth 19 and to the arm 17 a force which, relative to the second axis O2, generates a rotating moment in direction S4.

The configuration described above in which the first tooth 19 is disengaged from the toothing 13a of the ring gear 13 forms a second, non-operating limit position for the arm 17.

The first and second cam profiles, respectively 25 and 30, the arm 17 and the yielding element 31 form, as a whole, ratchet gear 39 release means.

According to the methods just described, simply rotating the operating lever 14 releases the ring gear 13 from the retaining action of both teeth 19, 26, thus allowing free rotation of the belt winding reel 6 even in the anti-clockwise direction S2, that is to say, in the direction for loosening the belt.

Advantageously, since both the ring gear 13 and the relative ratchet gear 39 are substantially closed in the proximal ring-shaped edge 6a, it is possible to keep said parts lubricated, therefore guaranteeing optimum friction reduction.

In this text the term tooth, used relative to the elements labelled 19 and 26, refers to any element designed to engage with the toothing of a ring gear or gearwheel.

Figure 5:
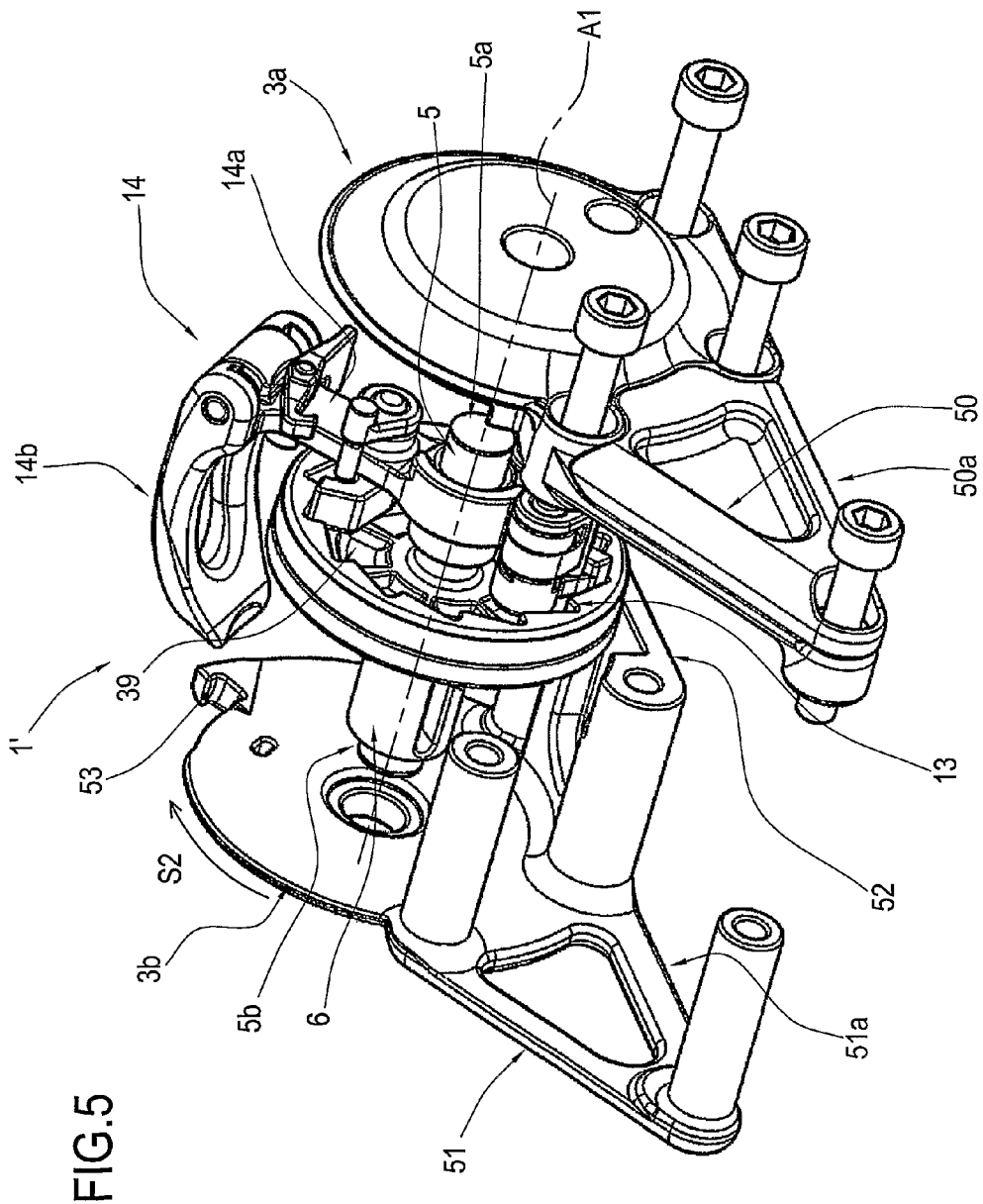
FIG. 5 is a perspective view with some parts exploded for clarity, of a first alternative embodiment of the tensioning device in the previous Figures.
Figure 6:
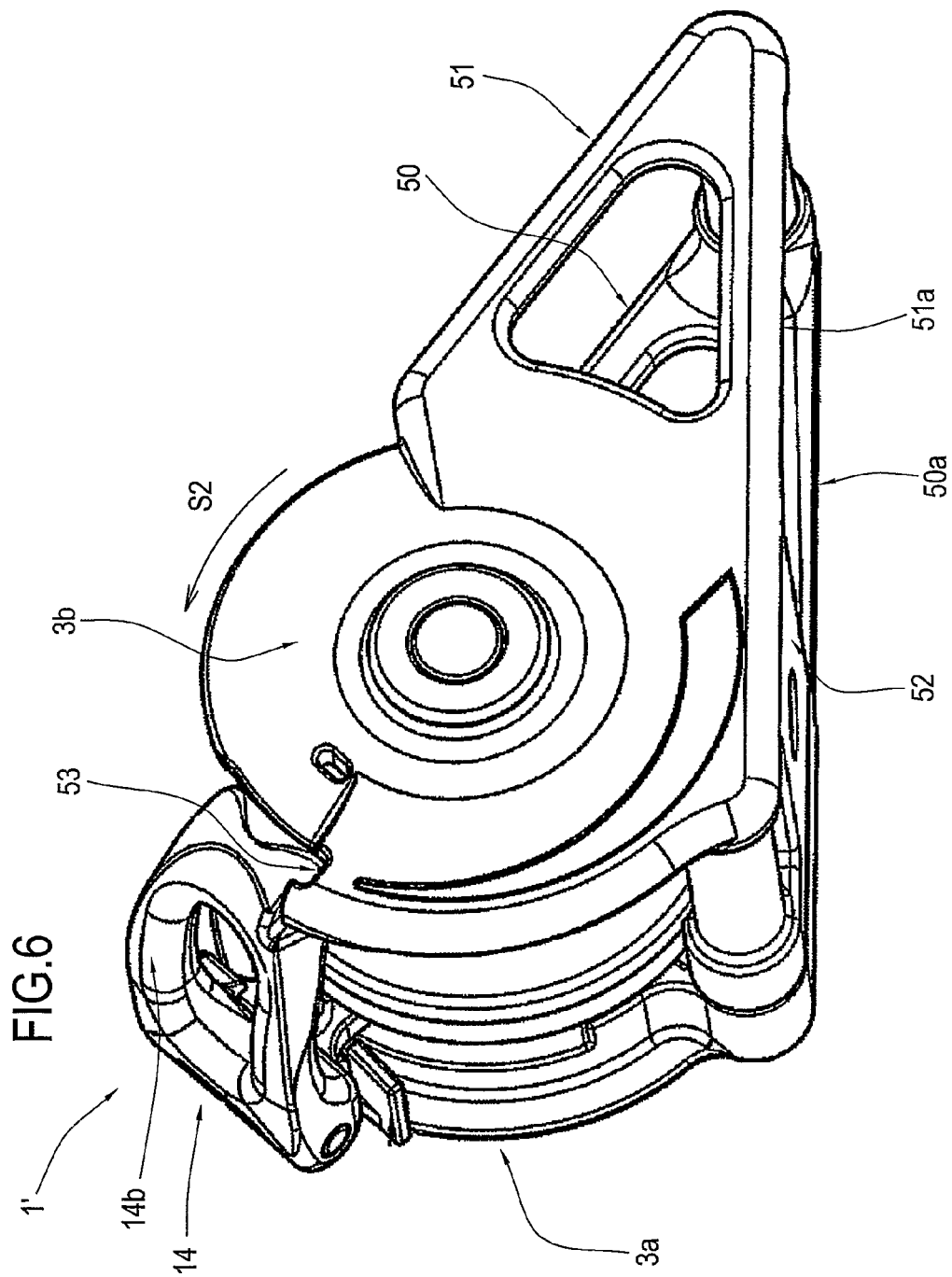
FIG. 6 is a perspective view from a different angle of the device from FIG. 5.

FIGS. 5 and 6 show a first alternative embodiment of the tensioning device disclosed. Said first alternative embodiment is labelled 1' as a whole, but, to keep the description clear and simple, its component parts corresponding and similar to those already described with reference to the device 1 are labelled, in FIGS. 5 and 6, with the same reference numbers used in the previous FIGS. 1 to 4.

The tensioning device 1' differs from the device 1 previously described substantially in that it comprises two platforms 3a, 3b which can be connected together and positioned at the longitudinally opposite ends of the first pin 5 which, therefore, in this embodiment, is not fitted in such a way that it is projecting, but is instead supported at both of its longitudinal ends 5a, 5b. Advantageously, the pin 5 is made in a single part with the reel 6 and rotates integrally with it relative to the base 2.

The platforms 3a, 3b, comprising respective offshoots 50, 51 with a roughly triangular shape, have respective lower edges 50a, 51a which, together with a connecting portion 52 between the platforms 3a, 3b, form for the device 1' a supporting surface designed to oppose the moment of force exerted by the user on the lever 14 while winding the belt on the reel 6.

As is clearly shown in FIG. 6, the platform 3b comprises a notch 53 designed to engage with an end portion of the lever 14, the latter resting in the notch when it assumes its minimum dimensions configuration. For the device 1' the notch 53 forms a safety element designed to prevent reel 6 rotation in the second direction of rotation indicated by the arrow S2.

Figure 7:
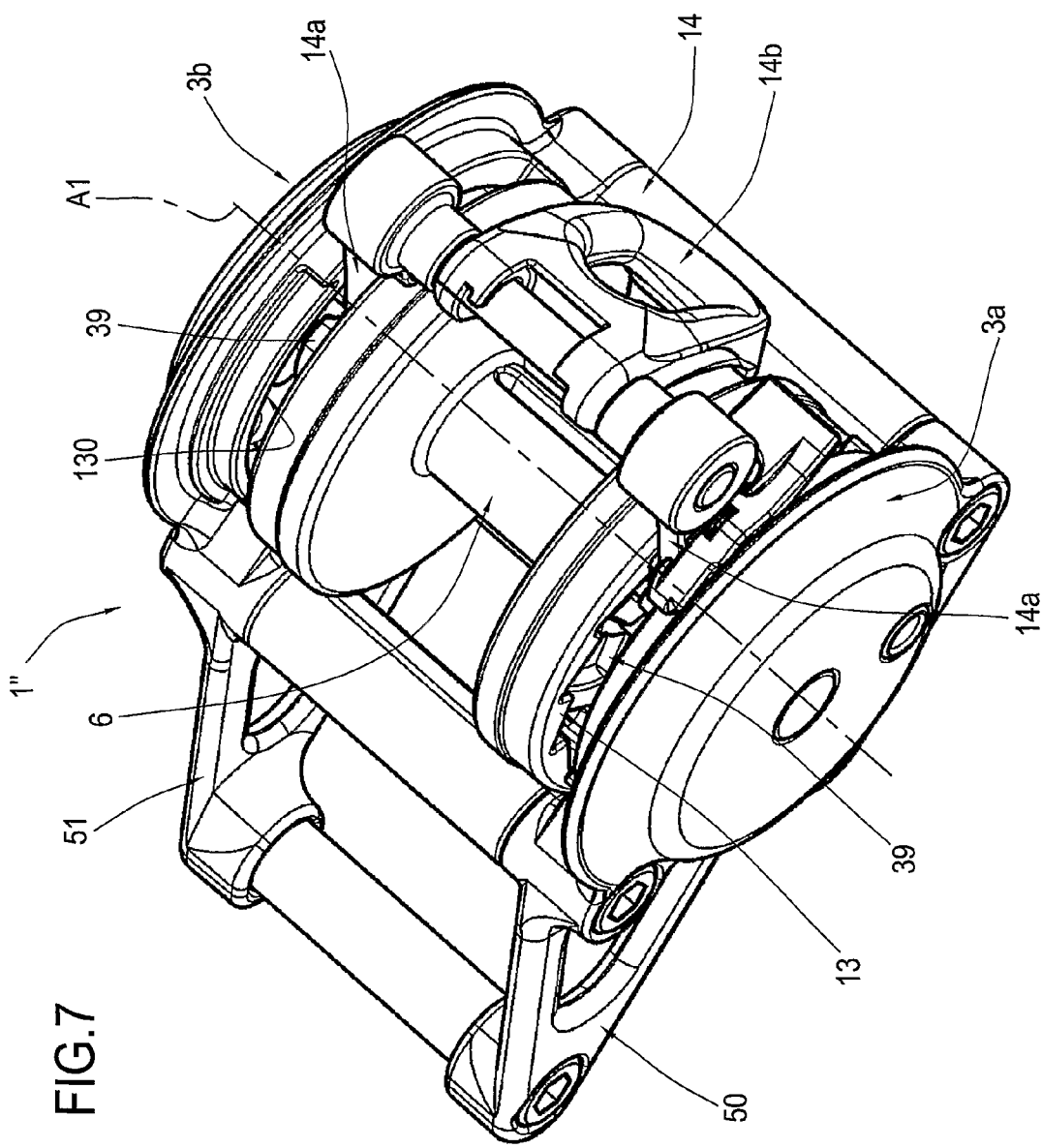
FIG. 7 is a perspective view of another alternative embodiment of the device in the previous Figures.

FIG. 7 shows a second alternative embodiment of the tensioning device disclosed. Said second alternative embodiment is labelled 1" as a whole, but, to keep the description clear and simple, its component parts corresponding and similar to those already described with reference to the devices 1 and 1' are labelled, in FIG. 7, with the same reference numbers used in the previous FIGS. 1 to 6.

The tensioning device 1" differs from both of the devices 1 and 1' previously described basically in that it comprises two ring gears 13, 130 with internal toothing positioned at the longitudinally opposite ends of the first pin 5, each of the ring gears 13 and 130 being positioned at a respective platform 3a, 3b.

Advantageously, the presence of two ring gears 13, 130 and, consequently, of two ratchet gears 39, allows a mechanism to be obtained in which the rotation transmitted to the reel 6 is imparted in a symmetrical and balanced fashion, so that it is also possible to increase the load which can be applied to the wound belt.

Figure 8:
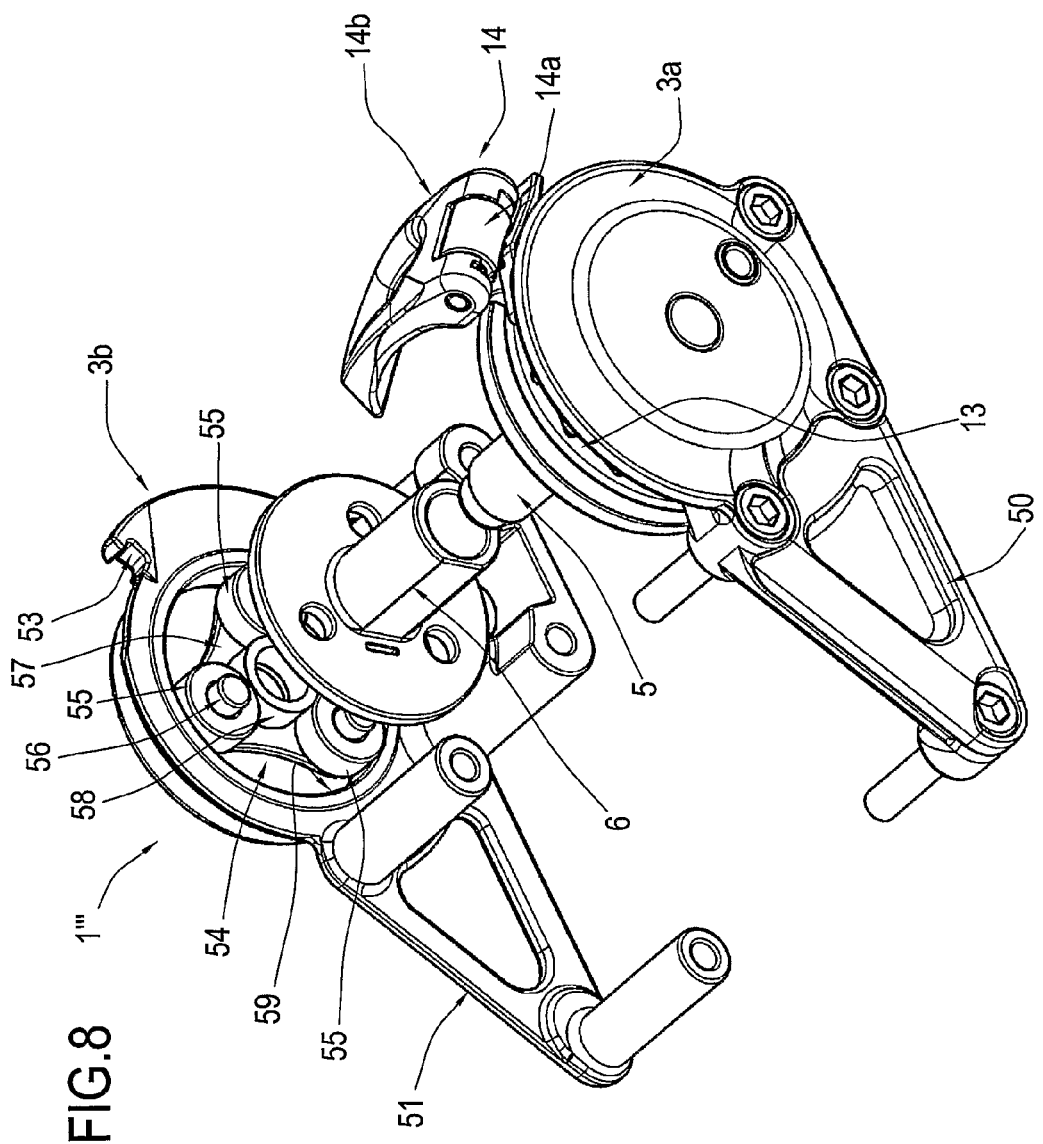
FIG. 8 is a perspective view with some parts exploded for clarity, of another alternative embodiment of the tensioning device in the previous Figures.

FIG. 8 shows a third alternative embodiment of the tensioning device disclosed. Said third alternative embodiment is labelled 1''' as a whole, but, to keep the description clear and simple, its component parts corresponding and similar to those already described with reference to the devices 1, 1' and 1" are labelled, in FIG. 8, with the same reference numbers used in the previous FIGS. 1 to 7.

The tensioning device 1''' basically differs from the devices 1, 1' and 1" previously described in that it comprises a planetary gear train 54 through which the rotation is transmitted to the reel 6.

In detail, the gear train 54 comprises a plurality of planet gears 55 fitted idly on the respective pins 56 of a planet gear support element 57, a central pinion 58 and internal toothing 59 made on the platform 3b.

The planet gear support element 57 is also fitted idly so that it is coaxial with the reel 6 and rotates about the axis A1.

In practice, rotation of the ring gear 13, which the pin 5 makes integral with the pinion 58, causes the latter to rotate.

During its rotation about the axis A1, the pinion 58 meshes on the planet gears 55 which in turn mesh on the internal toothing 59 of the platform 3b. The rotation of the planet gears 55 therefore causes, in the known way for planetary mechanism, rotation of the planet gear support element 57 about the axis A1 and, consequently, the reel 6 with which the pins 56 of the planet gears 55 engage is pulled in rotation.

Advantageously, use of a planetary gear train of the type just described allows a reduction in the gear ratio for movement between the ring gear 13 and the reel 6 on which the belt is wound, meaning that belt tension can be increased with the minimum of effort by the user.

With reference to the winding device illustrated in the accompanying drawings, the descriptions referred, by way of example, mainly to helical springs, but this does not limit in any way the possible use, in implementing the present invention, of elastic elements which have a different shape.

Advantageously, according to the alternative embodiments of the present invention illustrated in FIGS. 5 and 7, the ring gear is made in a single part with the belt winding reel.

The invention described has evident industrial applications and may be modified and adapted without thereby departing from the scope of the inventive concept. Moreover, all details of the invention may be substituted by technically equivalent elements.

The invention claimed is:

1. A device for tensioning a belt, the device comprising:
a supporting base;
a belt winding reel, the winding reel being able to rotate relative to the base about an axis of rotation
a ring gear rotating integrally with the reel,
an operating lever for rotating the reel in a first predetermined direction of rotation for winding the belt; and
a ratchet gear assembly operating on the ring gear, the ratchet gear assembly including a first tooth mounted to a support arm for engagement with the ring gear, the first tooth pivoting relative to the support arm about a first axis of oscillation and the support arm pivoting about a second axis of oscillation, the first tooth being designed to oscillate about the first and second axes of oscillation in order to prevent reel rotation in a second direction of rotation opposite to the first predetermined direction; and a respective release mechanism which disengages the first tooth from the ring gear in order to allow belt unwinding by reel rotation in the second direction of rotation.

2. The device according to claim 1, characterised in that the arm is designed to oscillate about the second axis of oscillation at least between a first, operating limit position where the first tooth is designed to engage with the ring gear and a second, non-operating limit position in which the first tooth is disengaged from the ring gear.

3. The device according to claim 2, characterised in that the operating lever comprises a first cam profile with a first sector designed to operate on the arm to keep the arm in its first, operating limit position.

4. The device according to claim 2, comprising elastic means operating on the arm to cause the arm to rotate about the second axis of oscillation and bring it from its first, operating position to its second, non-operating position.

5. The device according to claim 3, characterised in that the first cam profile has a second sector designed to operatively engage with the arm to allow the arm to move from the first limit position to the second, non-operating limit position.

6. The device according to claim 1, characterised in that the arm is mounted to and pivoted relative to the supporting base.

7. The device according to claim 1, characterised in that the first and second axes of oscillation are spaced apart and generally parallel with one another.

8. The device according to claim 1, comprising operating lever guide means designed to form a first predetermined active path which, the lever follows with alternating motion in order to wind the belt on the reel.

9. The device according to claim 8, characterised in that the guide means comprise a track in the base and a sliding element which slides along the track, the sliding element being supported by the lever and designed to engage with at least one end of the track.

10. The device according to claim 9, characterised in that the device further comprises means for disengaging the lever from the guide means.

11. The device according to claim 1, characterised in that the ring gear has internal toothing.

12. The device according to claim 1, characterised in that the supporting base comprises a platform, a first pin fixed on the platform, the reel for winding a first end of the belt being pivoted on the first pin, and an element for fixing a second end of the belt.

13. The device according to claim 12, characterised in that the first pin is fixed on the platform in such a way that it projects from it.

14. The device according to claim 12, characterised in that the operating lever comprises a first portion pivoted on the first pin and a second, handgrip portion, the first and second portions being connected to one another by a joint.

15. The device according to claim 14, characterised in that the second portion of the lever can rotate relative to the first portion about an axis lying in a plane perpendicular to the axis of rotation of the reel.

16. The device according to claim 1, characterised in that the supporting base comprises two platforms and a first pin supported, at its longitudinal ends, by the platforms, the belt winding reel being pivoted on the first pin.

17. The device according to claim 16, comprising two ring gears each positioned at a respective platform.

18. The device according to claim 16, characterised in that the operating lever comprises at least a first portion pivoted on the first pin and a second, handgrip portion, the first and second portions being connected to one another by a joint.

19. The device according to claim 18, characterised in that in one of the platforms there is a notch designed to engage with a portion of the lever, the notch forming a safety element designed to prevent reel rotation in the second direction of rotation.

20. The tensioning device according to claim 1, characterised in that the ring gear does not rotate integrally with the reel.

21. The device according to claim 20, comprising a planetary gear train operatively inserted between the ring gear and the reel, for transmitting rotation to the reel.

22. A device for tensioning a flexible element, the device comprising:
a supporting base;
a winding reel, the winding reel being able to rotate relative to the base about an axis of rotation, the winding reel having a cylindrical outer surface on which the flexible element is wound, and a inner surface;
a ring gear rotating integrally with the reel, the ring gear having a generally circular outer diameter and gear teeth formed along an inner diameter wherein the outer diameter of the ring gear is disposed adjacent the inner surface of the winding reel;
an operating lever for rotating the reel in a first predetermined direction of rotation for winding the flexible element; and
a ratchet gear, operating on the ring gear and designed to prevent reel rotation in a second direction of rotation opposite to the first predetermined direction; and
a release lever which disengages the ratchet gear from the ring gear for allowing the flexible element to unwind by reel rotation in the second direction of rotation.

23. A device for tensioning a belt, the device comprising:
a supporting base;
a belt winding reel, the winding reel being able to rotate relative to the base about an axis of rotation;
a ring gear rotating integrally with the reel;
an operating lever for rotating the reel in a first predetermined direction of rotation for winding the belt,
a ratchet gear, operating on the ring gear and designed to prevent reel rotation in a second direction of rotation opposite to the first predetermined direction, the ratchet gear comprises a first tooth for engagement with the ring gear, the first tooth being designed to oscillate about a first and second axis of oscillation, and a second tooth for engagement with the ring gear, the second tooth being supported by the operating lever and designed to oscillate relative to the lever about a third axis of oscillation; and
a respective release mechanism which disengages the first tooth and second tooth from the ring gear in order to allow the belt to unwind by reel rotation in the second direction of rotation.

24. The device according to claim 23, characterised in that the ratchet gear release mechanism comprises a second cam profile on the base and a yielding element integral with the second engagement tooth, the yielding element being designed to engage with the second cam profile to cause the second tooth to be disengaged from the ring gear.

* * * * *